United States Patent [19]
Heeks et al.

[11] Patent Number: 5,736,250
[45] Date of Patent: Apr. 7, 1998

[54] CROSSLINKED LATEX POLYMER SURFACES AND METHODS THEREOF

[75] Inventors: George J. Heeks, Rochester; Santokh S. Badesha, Pittsford; Clifford O. Eddy, Webster; Arnold W. Henry, Pittsford, all of N.Y.

[73] Assignee: Xerox Corporation, Stamford, Conn.

[21] Appl. No.: 694,121

[22] Filed: Aug. 8, 1996

[51] Int. Cl.⁶ .............. B32B 9/04; G03G 13/20; B25F 5/02

[52] U.S. Cl. .............. 428/447; 428/906; 430/124; 492/56; 399/333

[58] Field of Search .............. 428/447, 906; 430/124; 492/56; 399/333

[56] References Cited

U.S. PATENT DOCUMENTS

| | | | |
|---|---|---|---|
| 4,339,553 | 7/1982 | Yoshimura et al. | 524/544 |
| 4,853,737 | 8/1989 | Hartley et al. | 355/289 |
| 5,166,031 | 11/1992 | Badesha et al. | 430/124 |
| 5,281,506 | 1/1994 | Badesha et al. | 430/124 |
| 5,337,129 | 8/1994 | Badesha | 355/275 |
| 5,366,772 | 11/1994 | Badesha et al. | 428/35.8 |
| 5,370,931 | 12/1994 | Fratangelo et al. | 428/334 |
| 5,456,987 | 10/1995 | Badesha | 428/421 |

*Primary Examiner*—Mark Chapman
*Attorney, Agent, or Firm*—Annette L. Bade

[57] ABSTRACT

Crosslinked fluorocarbon elastomer surfaces comprised of a fluorocarbon elastomer and an amino siloxane and a method for providing a crosslinked fluorocarbon elastomer surface on a fuser member supporting substrate which includes mixing together an acid acceptor, an emulsifier, water, and amino siloxane with a latex fluorocarbon elastomer are provided.

40 Claims, 1 Drawing Sheet

CROSSLINKED LATEX POLYMER SURFACES AND METHODS THEREOF

BACKGROUND OF THE INVENTION

The present invention relates to elastomer surfaces and a process for providing elastomer/silicone surfaces, and more specifically to crosslinked fluoroelastomer/silicone surfaces on a supporting substrate useful in electrostatographic apparatii. In embodiments, the present invention relates to crosslinked elastomers of latex fluoroelastomers and amino siloxane and methods for preparing such crosslinked polymers. In addition, in embodiments, the present invention relates to methods for applying crosslinked fluoroelastomer surfaces on a substrate which reduces the emission of hydrocarbons by dispensing with the need for volatile solvents. The crosslinked fluoroelastomers are useful as surfaces for components in electrostatographic processes, especially xerographic processes, including the surfaces of fuser system members, or fuser members, including donor rolls, belts and the like; pressure rolls, belts and the like; fuser rolls, belts and the like; toner transfer rollers, belts and the like; along with intermediate transfer components such as intermediate transfer belts. The present invention provides an environmentally friendly fluoroelastomer surface for a fuser system member with the positive features of having sufficient chemical, physical and thermal stability, along with sufficient toughness.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor or convert into a fire, at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affects the fusing of the toner image onto the support. It is important in the fusing process that no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

Particularly preferred fusing systems are comprised of a heated cylindrical fuser roll having a fusing surface which is backed by a cylindrical pressure roll forming a fusing nip there-between. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in an electrostatographic printing system.

In U.S. Pat. No. 5,166,031, the disclosure of which is herein incorporated by reference in its entirety, there is illustrated a fuser member comprising a supporting substrate having an outer layer of a volume grafted elastomer which is a substantially uniform integral interpenetrating network of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator, and wherein the fluoroelastomer can be selected from a group consisting of poly(-vinylidene fluoride-hexafluoropropylene) and poly(vinylidene fluoride-hexafluoropropylene-tetrafluoroethylene).

U.S. Pat. No. 5,281,506, the disclosure of which is herein incorporated by reference in its entirety, discloses a method of fusing a thermoplastic resin toner image to a substrate comprising a polymeric release agent on the surface of a heated fuser member, said fuser member comprising a supporting substrate having an outer layer of a cured fluoroelastomer and having a thin surface layer of a polyorganosiloxane having been grafted to the surface of the cured fluoroelastomer in the presence of a dehydrofluorination initiator for the fluoroelastomer and from a polyorganosiloxane having reactive functionality.

U.S. Pat. No. 5,366,772, the disclosure of which is herein incorporated by reference in its entirety, describes an outer layer of a fuser member comprised of a substantially uniform integral interpenetrating hybrid polymeric network comprised of a haloelastomer, a coupling agent, a functional polyorganosiloxane and a crosslinking agent. The hybrid polymeric network is formed by the sequential reaction of the haloelastomer with a dehydrohalogenating agent, reaction with the coupling agent, condensation with the functional polyorganosiloxane and crosslinking with the crosslinking agent.

U.S. Pat. No. 5,370,931, the disclosure of which is herein incorporated by reference in its entirety, describes a grafted elastomer which is a substantially uniform integral interpenetrating network of a hybrid composition of a fluoroelastomer and a polyorganosiloxane, said graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator; and wherein said outer layer contains copper oxide in an amount of from 2 to 7 weight percent based upon the total weight of said outer layer.

U.S. Pat. No. 5,456,987, the disclosure of which is hereby incorporated by reference in its entirety, describes an intermediate transfer member having a layer comprised of a grafted titamer formed using a coupler having at least one pendant silane group.

U.S. Pat. No. 5,337,129, the disclosure of which is hereby incorporated by reference in its entirety, describes an intermediate transfer member comprising a substrate and a coating comprised of integral, interpenetrating networks of haloelastomer, silicon dioxide and optionally polyorganosiloxane coupled using an amine coupler having at least one pendant functional group such as silane.

U.S. Pat. No. 4,399,553, the disclosure of which is hereby incorporated by reference in its entirety, describes a water-based fluoroelastomer coating composition comprising a fluoroelastomer and an amino silane.

There is also known a water-based fluoroelastomer coating composition comprising an aqueous fluoroelastomer dispersion blended with a polyamine compound (e.g., hexamethylenediamine carbamate, N,N-dicynnamylidene-1,6-hexanediamine) as a vulcanizing agent (cf. DuPont's "Viton," Bulletin, No. 5, April, 1961).

Currently, fluorocarbon elastomer substrates have been applied as a thin layer to surfaces using an organic solvent spray or other liquid organic process. Normally, the fluorocarbon elastomer is first dissolved in volatile hydrocarbon solvents, such as acetone, methyl ethyl ketone, methyl isobutyl ketone and the like, to facilitate the deposition of the thin films of fluoroelastomer on the substrates to be coated and to enable the solvent to evaporate into the atmosphere within a reasonable period of time. The use of such volatile hydrocarbon solvents as diluents results in air pollution problems.

The drawbacks of using organic solvents or other liquid organic processes to coat surfaces with fluoroelastomers includes the high cost associated with the organic solvent and the attendant needed vapor filters. In addition, as the concern over hydrocarbon air pollution by state and federal governmental agencies and private interest groups increases year after year, and in addition, as environmental and health regulations on air pollution resulting from hydrocarbon solvents tighten over time, a need exists for a method for coating fluoroelastomers on surfaces that does not result in excessive hydrocarbon emission. Further, a need exists to produce fluoroelastomers such as the environmentally friendly fluoroelastomers just discussed, wherein these fluoroelastomers have the desirable properties necessary for a surface for a fusing system member, including sufficient toughness, along with sufficient chemical, physical and thermal stability, and properties allowing for a decrease in the problems associated with hot offset. In addition, there exists a need for a fuser surface which allows for little or no use of a release agent.

SUMMARY OF THE INVENTION

Examples of objects of the present invention include:

It is an object of the present invention to provide electrophotographic components and methods with many of the advantages indicated herein.

Another object of the present invention is to provide a method for providing a fluoroelastomer surface on a supporting substrate, wherein the method does not require the use of organic solvents and is, therefore, environmentally friendly.

Yet another object of the present invention is to provide a method for providing a fluoroelastomer surface on a supporting substrate which does not result in excessive hydrocarbon emission.

It is further an object of the present invention to provide a fluoroelastomer surface which has sufficient chemical, physical and thermal stability, along with sufficient toughness.

Also, an object of the present invention is to provide a fluoroelastomer surface on a supporting substrate which allows for a decrease in the occurrence of hot offset.

Still another object of the present invention is to provide a fluoroelastomer surface together with a method for providing a fluoroelastomer surface on a supporting substrate which is more cost effective than a number of known methods.

Still yet another object of the present invention is to provide a fluoroelastomer surface on a supporting substrate which dispenses with the need for releasing agents.

Many of the above objects have been met by the present invention, in embodiments, which includes: a fuser system member comprising a supporting substrate and thereon an outer surface comprising a latex fluorocarbon elastomer and an amino siloxane.

Many of the above objects have also been met by the present invention, in embodiments, which includes: a method for providing a crosslinked fluorocarbon elastomer composition outer surface on a fuser member supporting substrate comprising: a) mixing an acid acceptor, an emulsifier and water to form a first dispersion; b) forming a second separate dispersion comprising an amino siloxane; c) adding and reacting a latex fluorocarbon elastomer with said first and said second dispersions to form a homogeneous crosslinked fluorocarbon elastomer solution; and d) subsequently providing at least one layer of the homogeneous crosslinked fluorocarbon elastomer onto said fuser member supporting substrate.

Many of the above objects have further been met by the present invention, in embodiments, which includes: a method for providing a crosslinked fluorocarbon elastomer outer surface on a fuser member supporting substrate comprising: a) mixing an acid acceptor, an emulsifier, water and an amino siloxane to form a dispersion; b) adding and reacting a latex fluorocarbon elastomer with said dispersion to form a homogeneous crosslinked fluorocarbon elastomer; and c) subsequently providing at least one layer of the homogeneous crosslinked fluorocarbon elastomer onto said fuser member supporting substrate.

Many of the above objects have further been met by the present invention, in embodiments, which includes: a fuser comprised of a supporting substrate and an outer surface thereon comprising a latex fluorocarbon elastomer and an amino siloxane.

Many of the above objects have also been met by the present invention, in embodiments, which includes: an image forming apparatus for forming images on a recording medium comprising: a charge-retentive surface to receive an electrostatic latent image thereon; a development component to apply toner to said charge-retentive surface to develop said electrostatic latent image to form a developed image on said charge retentive surface; a transfer component to transfer the developed image from said charge retentive surface to a substrate; and a fusing component to fuse the developed image to said substrate, wherein said fusing component comprises a supporting substrate and an outer surface thereon comprising a fluorocarbon elastomer and an amino siloxane.

The present invention, the embodiments of which are further described herein, exhibits sufficient chemical, physical and thermal stability, along with sufficient toughness without the need for undesirable organic solvents.

BRIEF DESCRIPTION OF THE DRAWINGS

For a better understanding of the present invention, reference may be had to the accompanying FIG.

DETAILED DESCRIPTION OF THE PRESENT INVENTION

Figure 1:
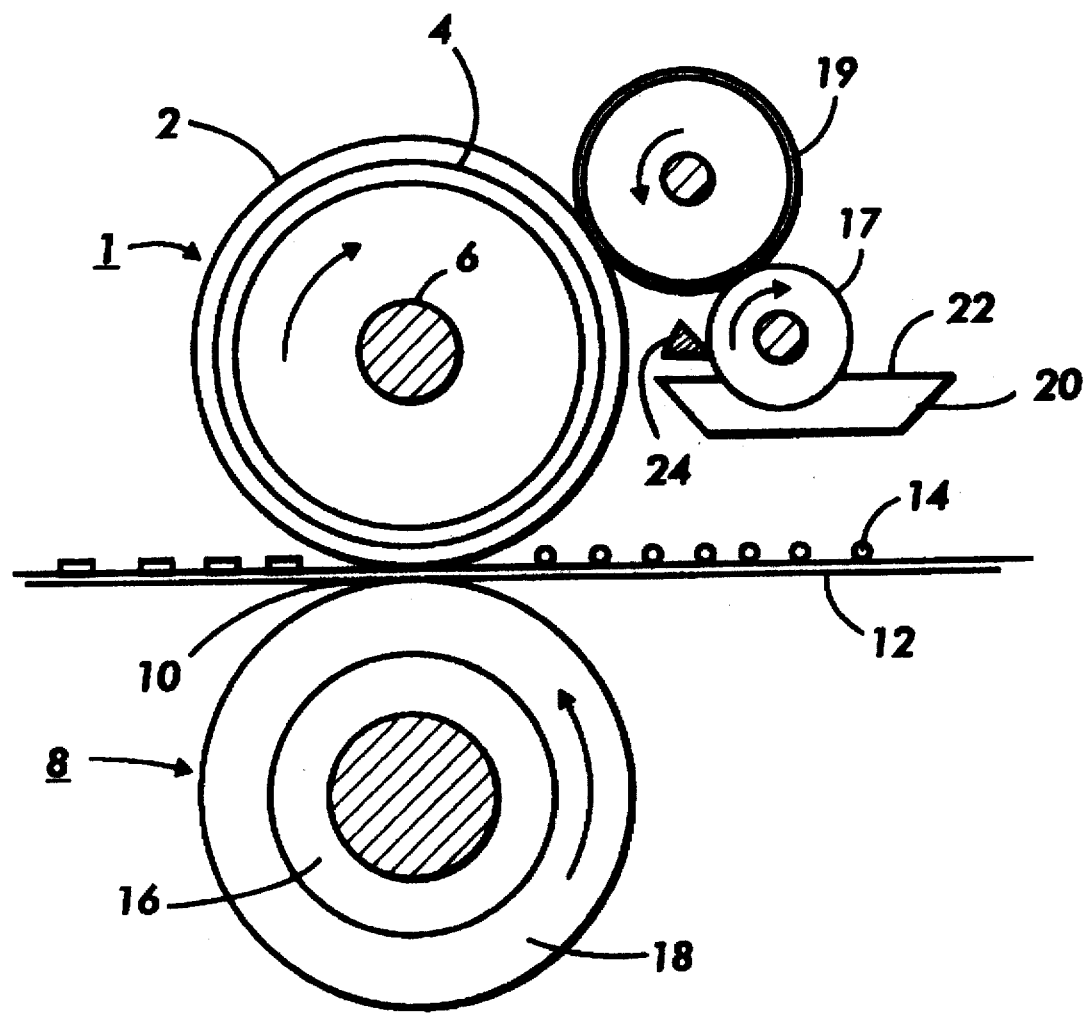
FIG. 1 represents a sectional view of a fuser system with a fuser member of an embodiment of the present invention.

The present invention relates to a fuser system member having an outer layer comprising a crosslinked hybrid composition comprising a latex fluorocarbon elastomer and an amino siloxane.

A known fusing system is comprised of fusing system members, including a supporting substrate such as a heated cylindrical fuser roll, film or belt having a fusing outer surface which is backed by a cylindrical pressure roll forming a fusing nip there-between. A release agent donor roll is also provided to deliver release agent to the fuser roll. While the physical and performance characteristics of each of these fusing system members, and particularly of their surfaces are not precisely the same depending on the various characteristics of the fusing system desired, the same classes of materials are typically used for one or more of the rolls in a fusing system in an electrostatographic printing system.

The present invention, in embodiments, enables surfaces as described in conjunction with a fuser assembly as shown in FIG. 1 where the numeral 1 designates a fuser roll comprising fluorocarbon elastomer surface 2 upon a suitable base member 4, a hollow cylinder or core fabricated from any suitable metal, such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact fluorocarbon elastomer surface 2 of fuser roll 1. As shown in FIG. 1, the backup roll 8 has a rigid steel core 16 with an fluorocarbon elastomer surface or layer 18 thereon. Sump 20 contains polymeric release agent 22 which may be a solid or liquid at room temperature, but it is a fluid at operating temperatures.

In the embodiment shown in FIG. 1 for applying the polymeric release agent 22 to fluorocarbon elastomer surface 2, two release agent delivery rolls 17 and 19 rotatably mounted in the direction indicated are provided to transport release agent 22 to fluorocarbon elastomer surface 2. Delivery roll 17 is partly immersed in the sump 20 and transports on its surface release agent from the sump to the delivery roll 19. By using a metering blade 24, a layer of polymeric release fluid can be applied initially to delivery roll 19 and subsequently to fluorocarbon elastomer 2 in controlled thickness ranging from submicrometer thickness to a thickness of several micrometers of release fluid. Thus, by metering device 24, about 0.1 to 2 micrometers or greater thicknesses of release fluid can be applied to the surface of fluorocarbon elastomer 2.

Generally, in embodiments, in the process for forming the invention fuser system member surface, the latex fluorocarbon elastomer is added last. In an embodiment, initially, two dispersions can be formed and subsequently, the latex fluorocarbon elastomer added therein. Alternatively, in another embodiment, a single dispersion is formed and subsequently, the latex emulsion is added therein.

In an embodiment using two initial separate dispersions, an acid acceptor and an emulsifier or surfactant are added initially with water to make a first dispersion. Curing and crosslinking agents (amino siloxane) can then be mixed with optional fillers and pigments to form a second separate dispersion. The latex fluorocarbon elastomer is then added together with the above two dispersions with gentle stirring. An anti-foaming agent such as BYK® 3105 or the equivalent can be added.

An alternative and preferred method is to mix together with gentle stirring an acid acceptor, water, emulsifier, and curing and crosslinking agents (amino siloxane). The dispersion can be allowed to cool before addition of the latex fluorocarbon elastomer. Next, the resulting dispersion is either allowed to air dry or cured in order to evaporate the water, and is post cured with heat.

A latex fluorocarbon elastomer is used in the present invention. Latex as used herein refers to a water-based stabilized dispersion of an elastomeric compound. Latex also refers to an essentially aqueous (for example, lack of organic solvents as used herein) medium. Examples of suitable latex fluorocarbon elastomers include copolymers of vinylidene fluoride and hexafluoropropylene; terpolymers of vinylidene fluoride, hexafluoropropylene and tetrafluoroethylene; and tetrapolymers of vinylidene fluoride, hexafluoropropylene and tetrafluoroethylene and a cure site monomer. Examples of suitable cure site monomers include 4-bromoperfluorobutene-1; 1,1-dihydro-4-bromoperfluorobutene-1;3-bromoperfluoropropene-1;1,1-dihydro-3-bromoperfluoropropene-1; or any other suitable, known cure site monomer commercially available from DuPont. It is preferred that the latex fluoroelastomers have a fluorine content of from about 50 to about 80, and preferably from about 68 to about 70 percent by weight. Specific latex fluoroelastomers are manufactured and are commercially available from Ausimont of Morristown, N.J. A particularly preferred latex fluoroelastomer is TECNOFLON TN (having 70% solids by weight), available from Ausimont of Morristown, N.J.

The amount of latex fluoroelastomer used to provide the surface of the present invention is dependent on the amount necessary to form the desired thickness of the layer or layers of surface material. The solids content of the final latex fluoroelastomer is from about 10 to about 70 weight percent, preferably from about 50 to about 60 weight percent. Such fluoroelastomer content can be readily obtained by concentration or dilution. When desired, the latex fluoroelastomer may contain any conventional additive such as a pigment, an acid acceptor or a filler in addition to the fluoroelastomer.

The latex fluoroelastomer of the present invention is crosslinked with an amino siloxane. The amino siloxane can function as both the dehydrodehalogenating agent and the crosslinking agent. It is preferable that the amino siloxane be bi- or multi- functional. Bifunctional as used herein refers to an amino siloxane with two amino groups and multifunctional as used herein refers to an amino siloxane with more than one amino group. Multifunctional as used herein encompasses both bifunctional and multifunctional. It is preferred that the amino groups be at the terminal position of the amino siloxane. In a particularly preferred embodiment of the invention, the amino siloxane in the present invention has the following general formula I:

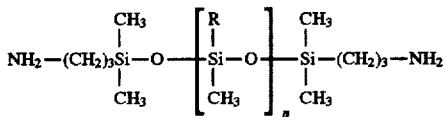

wherein n represents the number of repeating units and is preferably a number of from about 10 to about 45 and, preferably from about 25 to about 35. R can be alkyl of from 1 to about 25 carbon atoms such as methyl, ethyl, butyl, tert-butyl, or the like; or an aryl such as phenyl. Preferred amino siloxanes include polydimethylsiloxanes with amine functionality, and particularly preferred are polydimethylsiloxane copolymers with amine bi- or multi-functionality. Examples of the preferred amino siloxanes include, for example, amino siloxanes having as a comonomer (aminoethylaminopropyl) methyl such as PS805, PS806, PS807, PS808. PS809, PS810and the like; amino siloxanes having as a comonomer (aminopropyl) methyl such as, for example, PS811, PS811.5, P5812, P5813, PS814, PS815, PS816, PS817, PS818, PS819, PS820, and the like; and amino siloxanes having as a comonomer aminopropyldimethyl such as P5510, and the like. Particularly preferred amino siloxanes include PS510(α, ω, aminopropyldimethyl terminated polydimethyl siloxane), PS807 polydimethyl siloxane (amino ethylaminopropyl) methyl copolymer, and PS814 polydimethylsiloxane (amino propyl) methyl copolymer. The above mentioned specific amino siloxanes are commercially available from Union Chemical Technologies, Inc., Bristol, Pa.

The amino siloxane is added in an amount of from about 10 to 30 parts per hundred fluorocarbon elastomer and preferred is 15 to 20 parts per hundred fluorocarbon elastomer.

Although the mechanism of reaction by use of the amino siloxane is not exactly known, the preferred amino compounds are bi-functional or multi-functional and act as both a crosslinker and a dehydrohalogenator. Therefore, there is no need for additional crosslinkers to be added during the curing process. Accordingly, the unit manufacturing costs are thereby decreased.

An acid acceptor or dehydrofluorinating agent is added to an emulsifier or surfactant and water in the method for preparing the surfaces of the present invention. As the acid acceptor, it is preferred to use metal oxides, for example, those with a relatively low pH of from about 5 to about 8. Examples of suitable metal oxides include metal oxides such as magnesium oxide, calcium hydroxide and zinc oxide. The particularly preferred metal oxide is zinc oxide. Another class of suitable acid acceptors is amines. Examples of suitable amines include diamines, aliphatic and aromatic amines, where the aromatic groups may be benzene, toluene, naphthalene, anthracene, etc. Specific examples of amines or their Schiff base derivatives include N,N'-dicinnamylidene-1.6 hexanediamine (from about 2.5 to about 5 parts per hundred polymer) available under the tradename Tecnoflon Tecnocin-A; hexamethylenediamine carbamate (from about 1 to about 3 parts per hundred polymer) available under the tradename Tecnoflon Tecnocin-B; and triethylene tetramine or TETA (from about 1 to about 3 parts per hundred). The metal oxide acid acceptor is added in an amount of from about 2 to about 20 parts per hundred fluorocarbon elastomer, and preferred is from about 8 to about 15 parts per hundred fluorocarbon elastomer. The amine as the acid acceptor can be added in an amount of from about 0.5 to about 5 parts per hundred fluorocarbon elastomer, and preferably from about 1 to about 3 parts per hundred fluorocarbon elastomer. The diaminosiloxane can be added in an amount of about 10 to 20 parts per hundred fluoroelastomer.

An emulsifier or surfactant may be added in order to form the initial dispersion. In addition, the emulsifier functions to provide increased dispersion of the fillers, acid acceptor and curing and crosslinking agents. Examples of suitable emulsifies include sodiumlaurylsulphate, potassium laurylsulphate, ammonium laurylsulphate, or Triton® X-100 (octylphenoxypolyethoxy-ethanol-polyethylene glycol) manufactured by Union Carbide Chemicals & Plastics Company, Inc., of Danbury, Conn. A particularly preferred emulsifier is Triton® X-100. The emulsifier is added in various effective amounts, for example, an amount of from about 1 to about 10 parts per hundred fluorocarbon polymer with the preferred range being from about 1 to about 3 parts per hundred fluorocarbon elastomer.

Although any type of water may be used, for example, tap water, purified water such as single, double, and triple distilled water, and deionized water, tap water is not recommended. It is preferred that ambient deionized water of at least one meg ohm purity be used. The amount of water added is preferably equal to the total amount by weight of the acid acceptor and emulsifier. Preferably, water is added in an amount of from about 2 to about 20 parts per hundred elastomer.

Other adjuvants and fillers may be incorporated in the fluorocarbon elastomer in accordance with the present invention as long as they do not affect the integrity of the latex fluorocarbon elastomer. Such fillers normally encountered in the compounding of fluorocarbon elastomer include coloring agents, reinforcing fillers, alumina or other additives to increase thermal conductivity and processing aids. Oxides such as copper oxides may be added in certain amounts to the coatings of fuser members to provide sufficient anchoring sites for functional release oils, and thereby allow excellent toner release characteristics from such fuser members. However, the present invention provides an outer layer of a fuser member, wherein the outer layer has exceptional release properties. Therefore, little or no functional (having no chemical reactivity) fuser oil may be necessary. Optional reinforcing fillers may be added prior to addition of the latex fluorocarbon elastomer. Specific examples of preferred fillers include fillers having a pH of from about 5 to about 8. Examples of suitable fillers such as pigments include, for example, zinc oxide, iron II and iron III oxide, titanium dioxide and chromium oxides. Other suitable fillers include the clays and silicates such as calcium metasilicate or Neuburg clay. The fillers can be added in an amount of from about 1 to about 40 parts per hundred fluorocarbon elastomer with preferred being from about 25 to about 30 parts per hundred hydrocarbon elastomer.

The latex fluorocarbon elastomer may be applied to a substrate by spraying, dipping, flow coating, silk screening, or the like. The coating is first air dried and then heat cured (crosslinked). The air drying time is from about 30 minutes to about 48 hours, and preferred is from about 1 to about 24 hours. The temperature for air drying is from about 20 to about 60° C., preferably from about 40 to about 50° C. The fluorocarbon elastomer is subsequently heat cured. The heat curing time is from about 30 minutes to about 24 hours, preferably from about 1 to about 6 hours, and particularly preferred from about 1 to about 2 hours. The temperature of the heat cure is from about 25 to about 150° C. preferably from about 50 to about 100° C. and particularly preferred from about 60 to about 90° C. The post curing can be at a temperature of from about 100 to 250° C. and at a time of from about 1 hour to about 24 hours. The preferred post curing is for about 1 hour at about 250° C.

The outer surface of the latex fluorocarbon elastomer is preferably from about 25 to about 250, more preferably 35 to about 50 micrometers thick. This thickness range is selected to provide a layer thin enough to prevent a large thermal barrier for fusing and thick enough to allow a reasonable wear life.

The fuser system member substrate on which the latex fluorocarbon elastomer is coated may be a roll, belt, flat surface or other suitable shape used in the fixing of thermoplastic toner images to a suitable substrate. It may take the form of cylindrical sleeve, a drum, a belt or an endless belt. Specific examples of the fuser system member include a fuser member, a pressure member, a release agent donor member, preferably in the form of a cylindrical roll such as, for example, a fuser roll, a donor roll and a pressure roll. It may also take the form of an intermediate transfer belt. Typically, the fuser system member is made of a hollow cylindrical metal core, such as copper, aluminum, steel, or certain plastic materials chosen to maintain rigidity, structural integrity, as well as being capable of having the diaminosilicone crosslinked fluoropolymer coated thereon and adhered firmly thereto. In one embodiment, the core which may be a aluminum cylinder is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes.

Alternatively, there may be one or more, and possibly up to 10 intermediate layers between the substrate and the outer layer of the crosslinked fluoroelastomer if desired. Optional intermediate adhesive layers and/or elastomer layers may be applied to achieve desired properties and performance objectives of the present invention. An adhesive layer may be selected from a polymeric compound, for example, epoxy resins, silanes and polysiloxanes. Preferred adhesives are proprietary materials such as THIXON 4031404, Union Carbide A-i 100, Dow TACTIX 740, Dow TACTIX 741, and Dow TACTIX 742. A particularly preferred curative for the aforementioned adhesive is DOW TACMX 741 and 742, available from Dow Chemical Company. Typical elastomer layers include materials having the appropriate thermal and mechanical properties for such layers such as silicone elastomers and fluoroelastomers. Preferred elastomer layers comprise a fluoroelastomer or a silicone elastomer. The thickness of the intermediate layer is from 2 to 250 microns.

A silicone elastomer intermediate layer may be applied according to conventional techniques such as injection molding and casting after which it is cured for up to 15 minutes and at 120 to 180° C. to provide a complete cure without a significant post cure operation. This curing operation should be substantially complete to prevent debonding of the silicone elastomer from the core when it is removed from the mold. Thereafter, the surface of the silicone elastomer is sanded to remove the mold release agent and it is wiped clean with a solvent such as isopropyl alcohol to remove all debris.

The present fluorocarbon elastomer surfaces are also suitable for use with intermediate transfer components such as an intermediate transfer belt. Examples of intermediate transfer members are found in U.S. Pat. No. 5,110,702, the disclosure of which is hereby incorporated by reference in its entirety. This patent discloses non-electrostatic transfer of a toner image using a roll as an intermediate transfer member. Examples of intermediate transfer members are also found in U.S. Pat. No. 3,893,761, the disclosure of which is hereby incorporated by reference in its entirety. This patent discloses an intermediate transfer belt having a polyimide film substrate coated with a silicone rubber or a fluoroelastomer. Other examples of intermediate transfer components are found in U.S. Pat. Nos. 4,684,238; 4,690,539; 4,684,238; 4,690,539; 5,119,140; 5,099,286; and 5,150,161, the disclosures of which are hereby incorporated by reference in their entirety.

The resulting fuser system member surface comprises a crosslinked fluorocarbon elastomer which is comprised of a latex fluorocarbon elastomer crosslinked with amino siloxane, and in embodiments, a multifunctional amino siloxane, and in preferred embodiments is an interpenetrating network of latex fluorocarbon elastomer crosslinked with amino siloxane. In embodiments, the crosslinked fluoroelastomer/amino siloxane is a substantially uniform integral interpenetrating network of a hybrid composition, wherein both the structure and the composition of the latex elastomer and amino siloxane are substantially uniform when taken through different slices of the fuser member or intermediate belt member.

Interpenetrating network, in embodiments, refers to the addition polymerization matrix where the latex fluoroelastomer and amino siloxane strands are intertwined and crosslinked to one another.

The present invention dispenses with the additional costs associated with materials such as organic solvents and further, dispenses with the need for their disposal. This helps prevent air pollution and provides an environmentally friendly latex fluorocarbon elastomer emulsion. In addition, the present invention allows for little or no need for functional fusing oils which are normally necessary in preventing toner from adhering to the surface of the fuser member. Nonfunctional fuser oils would be preferred because of cost. Moreover, the present invention provides a fusing system member which has sufficient toughness, along with sufficient chemical, physical and thermal stability, and other properties allowing for a decrease in the problems associated with hot offset.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example I
Preparation of Latex Emulsion/Dispersion

A general but not exclusive approach for preparation of a latex emulsion is to prepare two or more ingredient dispersions and add them to the latex emulsion. For example, an acid acceptor and an emulsifier were mixed into an approximately equal weight of deionized water to form the first dispersion. Fillers and curatives were mixed in the same manner to form to make a second dispersion. These two dispersions were then slowly stirred into the latex containing fluoroelastomer, which may or may not contain an antifoaming agent, and in this case an antifoaming agent was added. This final dispersion was then ready for coating.

More specifically, fifty grams (10 parts per hundred polymer) of acid acceptor such as zinc oxide, for example zinc oxide from Aldrich, catalog number 20,553-2, and five grams (1 part per hundred polymer) of an emulsifier or surfactant such as emulsifier dodecyl sulfate, sodium salt, Aldrich catalog number 86201-0, were added to fifty grams (10 parts per hundred polymer) of deionized water in a glass bottle and rolled twenty four hours on a roll mill. Twenty grams of this dispersion were slowly stirred into 145 grams of a well dispersed TN Latex Tecnoflon from Ausimont. Twenty grams (20 parts per hundred fluoroelastomer) of United Chemical Technologies Inc. PS 510, aminopropyldimethyl terminated polydimethylsiloxane crosslinker and one half gram (0.5 parts per hundred polymer) of an antifoaming agent such as BYK 3105 from BYK CHEMIE were then slowly added with thorough mixing to the TN Latex dispersion. The final dispersion was then ready for coating a substrate. The coating was oven dried for 1 hour and 45 minutes at 130° F., 54° C., and cured/post cured for 18 hours at 194° F. and 90° C. The resulting layer was determined to be a crosslinked latex fluoroelastomer/polydimethylsiloxane surface.

Example 2

In an experiment to demonstrate how process conditions affect the coating quality, three samples of the aminosiloxane crosslinked formulation from Example 1 were prepared. Samples A and C were dried according to Example 1, and sample B was dried overnight at ambient temperature. Both A and B were then cured/post cured for 16 hours at 194° F., while C was cured/post cured for 16 hours at 400° F. Bubble formation in the sample was the criterion for quality measurement, in that little or no bubble formation demonstrated good workable quality. Sample B demonstrated the best results because it had no bubbles. Sample A also demonstrated adequate to good results with few bubbles. However, sample C had many bubbles.

Example 3

Two samples that differed only in the respect that one contained the aminosiloxane crosslinker and the other had no crosslinker, were prepared, coated, dried, cured and post cured according to the procedures outlined in Example 1. Both samples were soaked in 2-butanone, overnight. The crosslinked sample did not dissolve while the control, non-crosslinked sample completely dissolved showing no crosslinking.

Example 4

An aminosiloxane crosslinked sample of the TN Latex prepared according to Example 1 was soaked in 100 cSt. polydimethylsiloxane oil along with a Bisphenol AF crosslinked VITON GF as a control. After 23 hours the VITON GF control gained 0.25 weight percent while the aminosiloxane crosslinked TN gained 7.4 weight percent.

The aminosiloxane crosslinked fluoroelastomer showed some compatibility with polydimethylsiloxane oil while the limited swell or weight pickup of the VITON GF did not. These results demonstrate that the crosslinked fluoroelastomer of the present invention used as the surface of a fuser member, dispenses with the need for functional oil release agents which are normally necessary for adequate toner release. Further, these results demonstrate a decrease in the occurrence of hot offset.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A fuser system member comprising a supporting substrate and an environmentally friendly outer surface thereon comprising a crosslinked hybrid composition, wherein said hybrid composition comprises a latex fluorocarbon elastomer and an amino siloxane.

2. A fuser system member in accordance with claim 1, wherein said amino siloxane is multifunctional.

3. A fuser system member in accordance with claim 2, wherein said amino siloxane is a polydimethyl siloxane as represented by the following formula I,

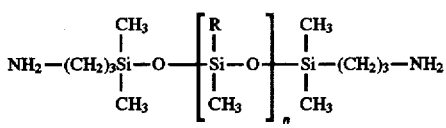

wherein R is selected from the group consisting of alkyl and aryl, and n represents the number of repeating units and is a number of from about 15 to about 45.

4. A fuser system member in accordance with claim 3, wherein the amino siloxane is a polydimethyl siloxane amino functional copolymer comprising a comonomer selected from the group consisting of (aminoethylaminopropyl) methyl, (aminopropyl) methyl, and (aminopropyl) dimethyl.

5. A fuser system member in accordance with claim 4, wherein the amino siloxane is an aminopropyldimethyl terminated polydimethyl siloxane.

6. A fuser system member in accordance with claim 5, wherein the amino siloxane is α, ω, aminopropyldimethyl terminated polydimethyl siloxane.

7. A fuser system member in accordance with claim 1, wherein the amino siloxane is present in an amount of from about 10 to about 30 parts per hundred fluorocarbon elastomer.

8. A fuser system member in accordance with claim 1, wherein the fluorocarbon elastomer is selected from the group consisting of: a) copolymers of vinylidene fluoride and hexafluoropropylene; b) terpolymers of vinylidene fluoride, hexafluoropropylene and tetrafluoroethylene; and c) tetrapolymers of vinylidene fluoride, hexafluoropropylene, tetrafluoroethylene and a cure site monomer.

9. A fuser system member in accordance with claim 8, wherein the fluorocarbon elastomer is selected from the group consisting of terpolymers of vinylidene fluoride, hexafluoropropylene and tetrafluoroethylene.

10. A fuser system member in accordance with claim 1, wherein the fluorine content of the fluorocarbon elastomer is from about 50 to about 80 weight percent.

11. A fuser system member in accordance with claim 1, wherein said outer surface is from about 25 to about 250 micrometers thick.

12. A fuser system member in accordance with claim 1, wherein said supporting substrate is a cylindrical roll.

13. A fuser member in accordance with claim 12, wherein said roll is comprised of a material selected from the group consisting of aluminum, copper and steel.

14. A fuser system member in accordance with claim 1, wherein said supporting substrate is an endless, flexible belt.

15. A fuser system member in accordance with claim 14, wherein said belt substrate is comprised of polyimide.

16. A fuser system member in accordance with claim 1, further comprising from about 1 to about 10 intermediate layers positioned between the supporting substrate and the outer surface.

17. A fuser system member in accordance with claim 16, wherein at least one of the intermediate layers is an elastomer layer or an adhesive layer.

18. A fuser system member in accordance with claim 17, wherein said intermediate layer is an elastomer layer comprising a silicone elastomer.

19. A fuser system member in accordance with claim 17, wherein said intermediate layer is an adhesive layer comprising a polymeric compound selected from the group consisting of epoxy resins and silanes.

20. A method for providing an environmentally friendly crosslinked fluorocarbon elastomer outer surface on a fuser member supporting substrate comprising: a) mixing an acid acceptor, an emulsifier and water to form a first dispersion; b) forming a second separate dispersion comprising an amino siloxane; c) adding and reacting a latex fluorocarbon elastomer with said first and said second dispersions to form a homogeneous crosslinked fluorocarbon polymer; and d) subsequently providing at least one layer of the homogeneous crosslinked fluorocarbon elastomer onto said fuser member supporting substrate.

21. A method in accordance with claim 20, further comprising heat curing the layer of homogeneous crosslinked fluorocarbon elastomer on the outer surface of said fuser member supporting substrate.

22. A method for providing an environmentally friendly crosslinked fluorocarbon elastomer outer surface on a fuser member supporting substrate comprising: a) mixing an acid acceptor, an emulsifier, water and an amino siloxane to form a dispersion; b) adding and reacting a latex fluorocarbon elastomer with said dispersion to form a homogeneous crosslinked fluorocarbon elastomer; and c) subsequently providing at least one layer of the homogeneous crosslinked fluorocarbon elastomer onto said fuser member supporting substrate.

23. A method in accordance with claim 22, wherein said amino siloxane is multifunctional.

24. A method in accordance with claim 22, wherein said amino siloxane is a polydimethyl siloxane of the formula,

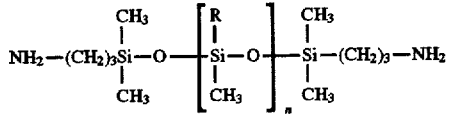

wherein R is selected from the group consisting of alkyl and aryl, and n is a number of repeating units and is from about 15 to about 45.

25. A method in accordance with claim 22, wherein the amino siloxane is a polydimethyl siloxane amino functional copolymer comprising a comonomer selected from the group consisting of (aminoethylaminopropyl) methyl, (aminopropyl) dimethyl and (aminopropyl) methyl.

26. A method in accordance with claim 25, wherein said amino siloxane is an aminopropyldimethyl terminated polydimethyl siloxane.

27. A fuser system member according to claim 26, wherein the amino siloxane is α, ω, aminopropyldimethyl terminated polydimethyl siloxane.

28. A method in accordance with claim 22, wherein the amino siloxane is present in an amount of from about 10 to 30 parts per hundred fluorocarbon elastomer.

29. A method in accordance with claim 22, wherein said latex fluorocarbon elastomer is selected from the group consisting of: a) copolymers of vinylidene fluoride and hexafluoropropylene; b) terpolymers of vinylidene fluoride, hexafluoropropylene and tetrafluoroethylene; and c) tetrapolymers of vinylidene fluoride, hexafluoropropylene, tetrafluoroethylene and a cure site monomer.

30. A method in accordance with claim 29, wherein said latex fluorocarbon elastomer is selected from a group consisting of terpolymers of vinylidene fluoride, hexafluoropropylene and tetrafluoroethylene.

31. A method in accordance with claim 22, wherein said acid acceptor is zinc oxide.

32. A method in accordance with claim 22, wherein said emulsifier is selected from the group consisting of octylphenoxpolyethoxy-ethanol-polyethylene glycol, sodium laurylsulphate and ammonium laurylsulphate.

33. A method in accordance with claim 22, further comprising addition of a metal oxide filler to said amino siloxane dispersion.

34. A method in accordance with claim 33, wherein said filler is selected from the group consisting of copper oxide, iron oxide and aluminum oxide.

35. A method in accordance with claim 22, further comprising addition of a pigment to the amino siloxane dispersion.

36. A method in accordance with claim 35, wherein said pigment is selected from the group consisting of iron II oxide, iron III oxide, titanium dioxide and chromium oxides.

37. A method in accordance with claim 22, wherein said water is deionized water.

38. A method in accordance with claim 22, further comprising heat curing the layer of homogeneous crosslinked fluorocarbon elastomer on the outer surface of said fuser member supporting substrate.

39. An image forming apparatus for forming images on a recording medium comprising:

a charge-retentive surface to receive an electrostatic latent image thereon;

a development component to apply toner to said charge-retentive surface to develop said electrostatic latent image to form a developed image on said charge retentive surface;

a transfer component to transfer the developed image from said charge retentive surface to a substrate; and a fusing component to fuse the developed image to said substrate, wherein said fusing component comprises a supporting substrate and an environmentally friendly outer surface thereon comprising a crosslinked hybrid composition, wherein said hybrid composition comprises a latex fluorocarbon elastomer and an amino siloxane.

40. A fuser system member comprising a supporting substrate and an environmentally friendly outer surface thereon comprising a crosslinked hybrid composition, wherein said hybrid composition comprises a latex fluorocarbon elastomer and a bifunctional amino siloxane.

* * * * *